United States Patent [19]

Suzuki et al.

[11] Patent Number: 4,517,305

[45] Date of Patent: May 14, 1985

[54] FINELY DIVIDED SILICON CARBIDE HAVING A HIGH CONTENT OF 2H-TYPE SILICON CARBIDE AND METHOD OF PRODUCING THE SAME

[75] Inventors: Hiroshige Suzuki, No. 39-9, 2-Chome, Kitasenzuku, Ohta-Ku, Tokyo, Japan; Teizo Hase, Tokyo, Japan

[73] Assignee: Hiroshige Suzuki, Japan

[21] Appl. No.: 428,627

[22] Filed: Sep. 30, 1982

Related U.S. Application Data

[63] Continuation of Ser. No. 299,929, Sep. 8, 1981, abandoned, which is a continuation of Ser. No. 154,215, May 29, 1980, abandoned, which is a continuation of Ser. No. 18,632, Mar. 8, 1979, abandoned.

[30] Foreign Application Priority Data

Mar. 15, 1978 [JP] Japan .................................. 53-28597
Mar. 15, 1978 [JP] Japan .................................. 53-28598
Mar. 15, 1978 [JP] Japan .................................. 53-28600

[51] Int. Cl.$^3$ ...................... C01B 31/36; C04B 35/56
[52] U.S. Cl. .......................................... 501/89; 501/90; 501/91; 264/65; 423/345; 423/346
[58] Field of Search ............................. 423/345, 346; 501/88–91; 264/65

[56] References Cited

U.S. PATENT DOCUMENTS

| | | | |
|---|---|---|---|
| 3,813,340 | 5/1974 | Knippenberg et al. | 423/346 |
| 3,836,673 | 9/1974 | Weaver | 501/91 |
| 3,960,619 | 6/1976 | Seiter | 423/345 X |
| 4,108,929 | 8/1978 | Prochazka | 501/90 X |

FOREIGN PATENT DOCUMENTS

| | | | |
|---|---|---|---|
| 1417816 | 10/1968 | Fed. Rep. of Germany | 423/346 |
| 50-18479 | 6/1975 | Japan | 423/345 |

OTHER PUBLICATIONS

Merz et al., "Chem. Abstracts", P.10885C, 1959.
Sokhor et al., "Chem. Abstracts", P.5046b, 1965.
Pandex et al., "Chem. Abstracts" P.180455a, 1978.

*Primary Examiner*—Jack Cooper
*Attorney, Agent, or Firm*—Parkhurst & Oliff

[57] ABSTRACT

Finely divided silicon carbide containing at least 10% by weight of 2H-type silicon carbide is very easily sinterable and can be sintered into a sintered body having a density of at least 85% of the theoretical density by sintering or a hot pressing at a temperature lower than the sintering temperature of ordinary $\beta$-type submicron silicon carbide.

12 Claims, 3 Drawing Figures

FIG_3

FINELY DIVIDED SILICON CARBIDE HAVING A HIGH CONTENT OF 2H-TYPE SILICON CARBIDE AND METHOD OF PRODUCING THE SAME

This is a continuation of application Ser. No. 299,929 filed Sept. 8, 1981 which in turn is a Rule 60 continuation of U.S. Ser. No. 154,215, filed May 29, 1980, which is a Rule 60 continuation of U.S. Ser. No. 18,632, filed Mar. 8, 1979 all now abandoned.

BACKGROUND OF THE INVENTION (1) Field of the Invention

The present invention relates to finely divided silicon carbide having a high content of 2H-type silicon carbide, a method of producing the silicon carbide, a high-density silicon carbide sintered body produced from the silicon carbide and a method of producing the silicon carbide sintered body.

(2) Description of the Prior Art

Silicon carbide is used in gas turbine, heat exchanger and the like as a best material for improving the high-temperature strength and thermal shock resistance thereof, and further used as a lining material for ball mill and as parts of burning tube and of instruments for handling corrosive liquid and liquid metal.

Silicon carbide has hitherto been considered to be a hardly sinterable material. However, it has recently been found out that a mixture of β-type submicron silicon carbide and sintering aids of boron and carbon can be sintered into a high-density sintered body having a given shape by a pressureless sintering process. However, this process requires a temperature higher than 2,000° C. in order to obtain a sintered body having substantially a high density. Such high sintering temperature requires a severe operation condition and is disadvantageous in the commercial production of the sintered body, and further often forms coarse plate-like particles having a size of as large as 200 μm in the resulting sintered body. Sintered bodies composed of particles having the smaller size have the higher mechanical strength, and the presence of large-size particles decreases the strength of sintered body. Accordingly, the formation of coarse particles must be suppressed as possible. However, when the sintering temperature exceeds 2,000° C. 6H-type silicon carbide is apt to be formed due to β-α transformation. The 6H-type silicon carbide grows at a rate fairly higher than the rate of growth of β-type silicon carbide, and therefore the 6H-type silicon carbide is once formed due to the transformation, coarse particles grow during the sintering and are contained in the resulting sintered body. In order to suppress this phenomenon, it has been attempted to blow nitrogen having an effect for suppressing the β-α transformation into the sintering atmosphere at high temperature. However, such process requires a temperature higher than that required in the case where nitrogen is not blown into the atmosphere, and requires more severe operation condition.

SUMMARY OF THE INVENTION

The present invention aims to obviate the above described drawbacks of conventional technics.

That is, an object of the present invention is to provide finely divided silicon carbide having a high content of 2H-type silicon carbide, which can be easily sintered into a sintered body.

Another object of the present invention is to provide a method of producing the finely divided silicon carbide by a solid phase reaction or a gas phase reaction.

A further object of the present invention is to provide a high-density silicon carbide sintered body having a density of at least 85% of the theoretical density.

A still further object of the present invention is to provide a method of producing the high-density silicon carbide sintered body by a sintering process or a hot press process.

A feature of the present invention is the provision of finely divided silicon carbide having a high content of 2H-type silicon carbide, which contains essentially at least 10% by weight of 2H-type silicon carbide and has a specific surface area of at least 5 m²/g.

Other objects and features of the present invention will be apparent from the following description.

DETAILED DESCRIPTION OF THE INVENTION

Figure 1:
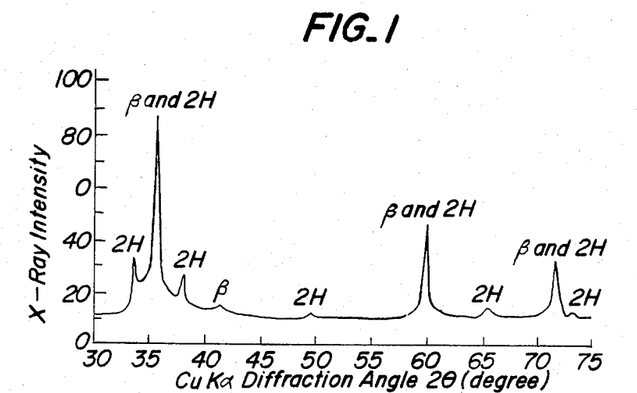
FIG. 1 is an X-ray diffraction pattern of silicon carbide powders of Sample No. 5 described in Table 3 in Example 1.
Figure 2:
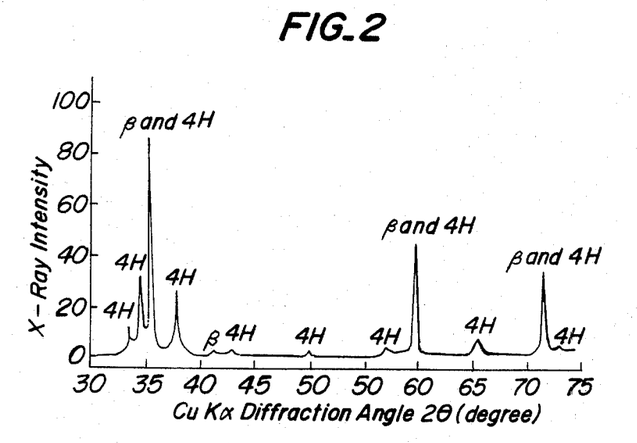
FIG. 2 is a powdery X-ray diffraction pattern of a silicon carbide sintered body of Sample No. 8 described in Table 5 in Example 3.
Figure 3:
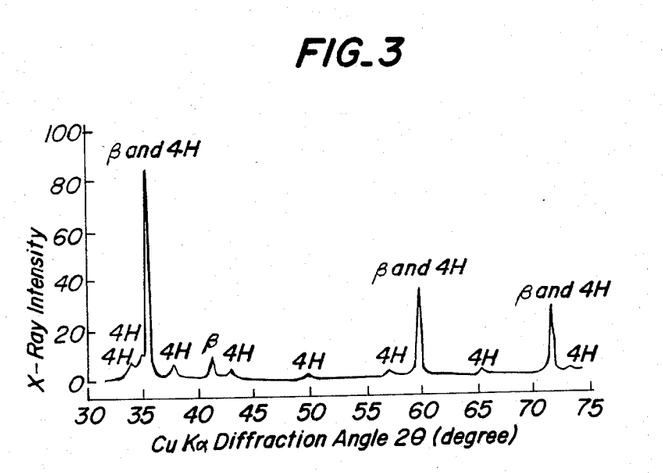
FIG. 3 is a powdery X-ray diffraction pattern of a silicon carbide sintered body of Sample No. 8 described in Table 7 in Example 6.

According to the present invention, silicon carbide sintered bodies having a fine crystal structure and a high density can be produced at a temperature of not higher than 2,000° C., particularly at a temperature within the range of 1,750°–1,950° C. by an ordinary sintering process, and a temperature of not higher than 1,750° C. by a hot press process by the use of submicron silicon carbide produced from a carbon source and a silicon source by a gaseous phase or solid phase reaction in the presence of aluminum dispersed uniformly in the reaction system. It has been found out from the X-ray diffractiometry that the silicon carbide powders consist of 2H-type silicon carbide and β-type silicon carbide, and further found out from the theoretical quantitative analysis that the silicon carbide powders contain at least 10% by weight of 2H-type silicon carbide.

Silicon carbide has various crystal structures. However, among the various silicon carbides, 2H-type silicon carbide is known as only one silicon carbide, which causes the intrasolid phase transformation. 2H-type silicon carbide as well as β-type silicon carbide is stable at low temperature, but substantially all silicon carbides produced in the ordinary reaction have β-type crystal structure. 2H-type silicon carbide has hitherto been obtained in a very small amount together with other type of silicon carbide through a particular gaseous phase reaction, and the properties thereof have not yet been completely clarified. Of course, a method for producing silicon carbide consisting mainly of 2H-type silicon carbide is not known. However, since 2H-type silicon carbide causes an intrasolid phase transformation, the silicon carbide ought to be used, for example, as active powders for sintering.

According to the present invention, silicon carbide powders containing at least 10% by weight of 2-type silicon carbide can be relatively easily obtained. It has been found from the X-ray diffractiometry that the above obtained silicon carbide powders consist of 2H-type silicon carbide and the remainder being β-type silicon carbide. However, since 2H-type silicon carbide alone has not been obtained at present as described above, an X-ray diffraction pattern of pure 2H-type silicon carbide powders has not yet been actually measured. Therefore, the quantitative analysis of 2H-type silicon carbide powders is usually theoretically carried out by assuming the complete crystal structure of 2H-type silicon carbide. Particularly, in the present invention, it is necessary to ascertain clearly the presence of 2H-type silicon carbide in a powdery silicon carbide product and further to determine actually the amount thereof. Therefore, methods for qualitative and quantitative analyses of 1H-type silicon carbide will be explained in detail and defined hereinafter.

The optimum method for analyzing silicon carbide containing 2H-type silicon carbide is the powdery CuKα X-ray diffractiometry. It is known that 2H-type silicon carbide has its peculiar peaks at 33.6°, 38.2°, 49.8°, 65.8° and 73.6° within a range of diffraction angles 2θ of from 32° to 75° in the powdery CuKα X-ray diffractiometry. Further, a peak peculiar to β-type silicon carbide appears only at 41.4°, and peaks formed by the overlapping of the X-ray diffraction patterns of 2H-type silicon carbide and β-type silicon carbide appear at 35.6°, 60.1° and 72.2°. It has been ascertained that all the peaks of the silicon carbide powders produced in the method of the present invention agree with the above described peaks, and the silicon carbide powders has no peaks at any diffraction angles other than the above described diffraction angles. That is, it is ascertained that the silicon carbide produced in the method of the present invention consists of 2H-type silicon carbide and β-type silicon carbide. When silicon carbide is produced at a temperature higher than that defined in the present invention or in the presence of aluminum in an amount larger than that defined in the present invention, the amount of 2H-type silicon carbide formed in the reaction decreases or 2H-type silicon carbide is not at all produced, but 4H-type silicon carbide is produced. The diffraction peaks peculiar to 4H-type silicon carbide appear at 34.9°, 43.5° and 57.2°, and 4H-type silicon carbide can be easily distinguished from β-type and 2H-type silicon carbides.

The amount of 2H-type silicon carbide is determined by comparing the theoretical X-ray diffraction intensity calculated based on the crystal structure of 2H-type silicon carbide with the observed X-ray diffraction intensity thereof. It is generally known that 2H-type silicon carbide has an incomplete crystal structure containing a large amount of structural defects in the crystal, and therefore 2H-type silicon carbide is apt to have a diffraction intensity lower than the theoretical diffraction intensity. In the 2H-type silicon carbide of the present invention also, the diffraction peak at 33.6° appears relatively intensively, but many of other peaks than the peak at 33.6° are not so intense to satisfy the theoretical intensity ratio. Accordingly, the inventor have derived a method for determining the amount of 2H-type silicon carbide from the diffraction intensities at the peaks at 33.6° and 38.2° peculiar to 2H-type silicon carbide and the diffraction intensity at the peak at 35.6°. Since the silicon carbide powders of the present invention consist of 2H-type and β-type silicon carbides, formulae for determining the amount of 2H-type silicon carbide are derived in the same procedure as that proposed by Kawamura in Mineralogical Journal, Vol. 4, No. 5 (1965), page 333, which is commonly known as a simple method for analyzing quantitatively a mixed crystal structure.

When the amount of 2H-type silicon carbide is determined by the use of a peak at 33.6° and a peak at 35.6°, the following derived formulae are used.

$$x = \frac{2.531}{100 \cdot 0.6681} I$$

In the above formulae, I is a value, which is 100 times larger than the ratio of the X-ray diffraction intensity (height of peak) peculiar to 2H-type silicon carbide at a diffraction ange of 33.6° by the CuKα X-ray to the X-ray diffraction intensity at a diffraction angle of 35.6°.

The following Table I shows numerical values used in the derivation of the above described formulae.

TABLE 1

| Diffraction angle by CuKα (2θ) | 35.6° | 35.6° | 33.6° |
|---|---|---|---|
| Crystal structure | β-type | 2H—type | 2H—type |
| Diffraction plane | (111) | (0002) | (1010) |
| Structural factor, $|F|^2$ | 906.5 | 425.1 | 187.0 |
| Multiplicity, P | 8 | 2 | 6 |
| Lorentz polarization factor, LP | 18.67 | 18.67 | 21.18 |
| Diffraction intensity, $P \times LP \times |F|^2$ | 135400 | 15870 | 23760 |

When the amount of 2H-type silicon carbide is determined by the use of a peak at 35.6° and a peak at 38.2°, the following derived formulae are used.

$$y = \frac{1.8951}{100 \cdot 0.5001} I$$

In the above formulae, I is a value, which is 100 times larger than the ratio of the X-ray diffraction intensity (height of peak) peculiar to 2H-type silicon carbide at a diffraction angle of 38.2° by the CuKα X-ray to the X-ray diffraction intensity at a diffraction angle of 35.6°. The following Table 2 shows the numerical values used in the derivation of the above described formulae.

TABLE 2

| Diffraction angle by CuKα (2θ) | 35.6° | 35.6° | 38.2° |
|---|---|---|---|
| Crystal structure | β-type | 2H—type | 2H—type |
| Diffraction plane | (111) | (0002) | (1011) |
| Structural factor, $|F|^2$ | 906.5 | 425.1 | 165.3 |
| Multiplicity, P | 8 | 2 | 12 |
| Lorentz polarization factor, LP | 18.67 | 18.67 | 15.99 |
| Diffraction intensity, $P \times LP \times |F|^2$ | 135400 | 15870 | 31720 |

The diffraction peaks used in the quantitative analysis partly overlap with each other at their lower portion, and therefore it is necessary that the overlapped portions are separated from each other by a commonly used method and then the background is subtracted to calculate the true diffraction intensity.

As already explained in the specification, it is known from the investigation relating to 2H-type silicon carbide hitherto been obtained in a very small amount together with other type of silicon carbide that 2H-type silicon carbide generally has an incomplete crystal structure. Particularly, in the finely divided silicon carbide produced in the present invention, the 2H-type silicon carbide has probably more incomplete crystal structure. Therefore, the amount of 2H-type silicon carbide determined by the above described method is the lowest amount of 2H-type silicon carbide actually contained in the finely divided silicon carbide.

The present invention will be concretely explained hereinafter.

When silicon carbide is produced through a conventional gaseous phase reaction or a solid phase reaction, such as $Si+C$, $SiO+2C$ or $SiO_2+3C$, it is necessary that the reaction is carried out in the presence of metallic aluminum or an aluminum compound, which is converted into metallic aluminum during the reaction, in an amount that the reaction system contains 0.5-5 parts by weight of aluminum in the case of gaseous phase reaction or 1-20 parts by weight of aluminum in the case of solid phase reaction based on 100 part by weight of silicon carbide (SiC) to be formed. The optimum amount of aluminum lies in the vicinity of the medium value of the above described range. When the amount of aluminum is less than the medium value, 2H-type silicon carbide is formed in a smaller amount, and when the amount of aluminum is more than the medium value, the metallic aluminum or aluminum compound remains in a larger amount in the resulting silicon carbide powders. When the amount of aluminum is less than the lower limit of the above described range, the 2H-type silicon carbide content in the resulting silicon carbide is further decreased, and when the amount of aluminum is more than the upper limit of the above described range, 4H-type silicon carbide is formed rather than 2H-type silicon carbide. In the case of a gaseous phase reaction, 2H-type silicon carbide is formed by reacting a mixture consisting essentially of vapors of a silicon halide and a hydrocarbon, or decomposing trichloromethylsilane in the presence of aluminum halide vapors.

The reaction for forming 2H-type silicon carbide is carried out within the temperature range of 1,200°–1,500° C. As the reaction temperature is lower, unreacted substance is apt to remain, and when the reaction temperature is higher than 1,500° C., 4H-type silicon carbide is formed rather than 2H-type silicon carbide. The optimum reaction temperature is 1,300°–1,400° C. in the gaseous phase reaction and is 1,340°–1,440° C. in the solid phase reaction.

When a reaction for forming 2H-type silicon carbide is carried out in gaseous phase, the reaction may be carried out under normal pressure. While, when a reaction for forming 2H-type silicon carbide is carried out in solid phase, the reaction rate can be increased by the use of a reaction atmosphere kept under a vacuum degree of not lower than 10 mmHg. A further high vacuum degree serves to evaporate and remove unreacted aluminum or aluminum compound. As the result, the aluminum content in the resulting silicon carbide powders can be decreased to not more than 1% by weight.

About one half of the amount of aluminum initially added after remains in the resulting silicon carbide powders. When a gaseous phase reaction is carried out, or when a solid phase reaction is carried out in the presence of metallic aluminum, aluminum or aluminum compound used in the reaction is apt to remain in the resulting silicon carbide powders in the form of metallic aluminum. Therefore, in this case, a major part of the metallic aluminum can be removed by the hydrochloric acid treatment. However, when aluminum remains in the resulting silicon carbide powders in the form of insoluble aluminum compound, the aluminum compound is difficult to be removed, and therefore it is desirable that the vacuum degree and heating time are properly selected at the reaction to evaporate and remove aluminum.

One of the characteristics of the finely divided silicon carbide containing a large amount of 2H-type silicon carbide, which is obtained in the present invention, lies in that the silicon carbide can be sintered very easily. That is, the finely divide silicon carbide can be formed into a sintered body having a sufficiently high density at a temperature about 200°–300° C. lower than the sintering temperature of ordinary submicron silicon carbides. The finely divided silicon carbide is sintered at 1,700°–2,000° C. under atmospheric pressure under an inert atmosphere or hot pressed at a temperature of 1,500°–1,900° C. under a pressure of 50–700 $kg/cm^2$ under an inert atmosphere.

A method for producing a silicon carbide sintered body having a high density and a high strength by the sintering or hot pressing from the above obtained finely devide silicon carbide will be explained hereinafter.

The finely divided silicon carbide having a high content of 2H-type silicon carbide, which is used in the production of the sintered body, is produced, for example. in the following manners. A mixture of vapors of 1 part of trichloromethylsilane and 0.026 part of aluminum chloride is introduced into a reaction chamber heated up to 1,300° C. together with hydrogen as a carrier gas at a rate enough to cause a turbulent flow, and a gaseous phase reaction is carried out in the reaction chamber. The resulting silicon carbide fine powders contain at least 35% by weight of 2H-type silicon carbide and has a specific surface area of 12 $m^2/g$. Alternatively, the finely divided silicon carbide can be produced by reacting a homogeneous mixture of 1 part by weight of carbon black, 1.67 parts by weight of colloidal silica and a 0.17 part by weight of aluminum formate as an aluminum source at a temperature of 1,440° C. under a reduced pressure having a vacuum degree of not lower than 10 mmHg. In this case, 2.01 parts by weight of silicon monoxide and 0.15 part by weight of metallic aluminum may be used in place of colloidal silica and aluminum formate. The finely divided silicon carbide contains at least 17–30% by weight of 2H-type silicon carbide and has a specific surface area of 30–40 $m^2/g$. The excess aluminum added to the reaction system at the production of the silicon carbide powders can be removed by heating the resulting silicon carbide powders under a reduced pressure to evaporate the aluminum or by treating the resulting silicon carbide powders with hydrochloric acid to dissolve out the aluminum. However, it is also necessary that the amount of aluminum is regulated so as to leave the aluminum in the resulting silicon carbide powders in an amount necessary for sintering.

Boron or a boron compound is added to the reaction system for the production of the above described silicon carbide powders, or boron and carbon are homogeneously mixed with the above obtained silicon carbide powders, thereby powders having a composition necessary for sintering is produced. For example, when the above described finely divided silicon carbide containing at least 17% by weight of 2H-type silicon carbide is produced, aluminum is added to the reaction system so that the resulting finely divided silicon carbide contains 2% by weight of aluminum, and the finely divided silicon carbide is homogeneously mixed with boron and carbon in amounts that the resulting powders contain 1.0% by weight of each of boron and carbon, and powders are used as raw material powders for sintering. Further, silicon carbide powders produced by the vapor phase process after contain free carbon in an amount of more than the necessary amount for sintering. Therefore, the silicon carbide powders are once heated at a temperature of 400°–450° C. in air to burn the carbon, and then treated with hydrofluoric acid. For example, silicon carbide powders containing at least 35% by weight of 2H-type silicon carbide, 0.8% by weight of free carbon and 1.2% by weight of aluminum are mixed with boron in an amount of 0.4% by weight based on the total amount of the silicon carbide powders and boron, and the resulting mixture is used as raw material powders for sintering. The above obtained raw material powders for sintering are mixed with 3% by weight, based on the total amount of the powders and dibutyl phthalate, of dibutyl phthalate as a molding assistant. The resulting mixture is kneaded and then molded under a hydrostatic pressure. The molded article has a density of about 50% of theoretical density. The resulting molded article is sintered at a temperature of 1,800°–1,900° C. within 40 minutes in pure helium kept under atmospheric pressure to botain a sintered body having a density of as high as 94% of the theoretical density.

Further, when the silicon carbide having a high content of 2H-type silicon carbide to be used in the present invention is mixed with ordinary β-type submicron silicon carbide in a weight ratio of 50:50, the resulting powdery mixture can be sintered at a low temperature of not higher than 2,000° C. which is lower than the sintering temperature of the β-type submicron silicon carbide alone, and moreover the resulting sintered body has a density higher than that of a sintered body produced from the β-type submicron silicon carbide alone.

The silicon carbide sintered body produced by the above described methods consists of fine particles having a size of about 10 μm. Therefore, it can be expected that the sintered body has a high mechanical strength. Indeed, the sintered body has a bending strength of not lower than 60 kg/mm$^2$ in the 3-point bending test under a condition of 10$^{-4}$ mmHg and 1,500° C. Since the sintered body of the present invention is produced at a low sintering temperature, the sintered body is remarkably different in the crystal structure from the conventional sintered body, and is characterized by having crystal structures consisting of β-type crystal structure and 4H-type crystal structure, which has been mainly formed by the transformation of 2H-type crystal structure.

According to the present invention, a sintered body having a high density and a high strength can be produced by a sintering temperature lower than that in the conventional sintering process.

Then, a method for producing a sintered body a hot press process from the silicon carbide powders obtained in the present invention will be explained.

Silicon carbide powers for sintering, produced in the above described methods, for example, consists essentially of at least 30% by weight of 2H -type silicon carbide and the remainder being β-type silicon carbide, and have a specific surface area of 31 m$^2$/g. The silicon carbide powders contain 1.5% by weight of aluminum incorporated thereinto during the production thereof, and are directly mixed homogeneously with boron and carbon in amounts that the resulting mixture contains 1% by weight of each of boron and carbon, and the mixture is used as raw material powders for sintering. The raw material powders are charged in a graphite mold and sintered therein at a temperature of 1,650° C. under a pressure of 300 kg/cm$^2$ in pure argon. The resulting sintered body has a homogeneous texture consisting of very fine particles of 1.5 μm size, and has a density of as high as 98% of the theoretical density and a very high strength of about 70 kg/mm$^2$ in the 3-point bending test under a condition of 10$^{-4}$ mmHg and 1,400° C. The sintered body is remarkably different from the conventional sintered body in the crystal structures forming the sintered body. That is, due to the low sintering temperature, the resulting sintered body is characterized in that the sintered body has crystal structures consisting of 2H-type crystal structure and 4H-type crystal structure formed by the transformation of 2H-type crystal structure.

Further, when the finely divided silicon carbide having a high content of 2H-type silicon carbide according to the present invention is mixed with ordinary α-type or β-type submicron silicon carbide in an amount that the resulting mixture contains up to 50% by weight of the α-type or β-type silicon carbide, the resulting mixture can be hot pressed into a sintered body at a temperature 100°–200° C. lower than the hot press temperature of ordinary α-type or β-type submicron silicon carbide alone, and a sintered body having a high density of at least 95% of the theoretical density can be obtained. The resulting sintered body consists of fine particles having a size of not larger than 3 μm, and has a bending strength of about 60 kg/cm$^2$ in the 3-point bending test under the same condition of 10$^{-4}$ mmHg and 1,400° C. as described above.

According to the present invention, a sintered body can be produced by a hot press process at a temperature lower than the sintering temperature in the conventional hot press process, and a sintered body having a homogeneous fine crystal structure and having a high density and a high strength can be inexpensively produced.

The following examples are given for the purpose of illustration of this invention and are not intended as limitations thereof. In the examples, "parts" and ":" mean by weight unless otherwise indicated.

EXAMPLE 1

Experiments for the production of silicon carbide by reacting colloidal graphite or carbon black with metallic silicon (particle size: 2–5 μm), silicon monoxide (particle size: not larger than 44 μm) or colloidal silicon dioxide are shown in the following Table 3. In Table 3, Mixture A consists of 1 part colloidal graphite and 1.67 parts of colloidal silicon dioxide; Mixture B consists of 1 part of carbon black and 2.01 parts of silicon monoxide; Mixture C consists of 1 part of carbon black and 1.67 parts of collidal silicon dioxide; and Mixture D consists of 1 part of carbon black and 2.33 parts of metallic silicon. Each of mixtures was reacted in the presence of metallic aluminum having an average particle size of 5 μm or an aluminum compound described in Table 3 at a temperature described in Table 3 under a reduced pressure having a vacuum degree of not lower than 10 mmHg. It was found from the X-ray diffractiometry that the resulting silicon carbide powders consisted of 2H-type and β-type silicon carbides. The lowest content of 2H-type silicon carbide in the resulting silicon carbide powders was determined by the quantitative analysis method hereinbefore described in this specification. The result of the quantitative analysis is shown in the following Table 4. In Table 4, the numerical value under the heading of 33.6°-2H shows the content of 2H-type silicon carbide in the resulting silicon carbide powders determined from the peak at 33.6° and the numerical value under the heading of 38.2°-2H shows the content thereof determined from the peak at 38.2°. It can be illustrated from the results of the analysis that the silicon carbide powders produced in the method of the present invention contain at least 10% of 2H-type silicon carbide.

In the reaction of Sample No. 2 in Table 3, since unreacted carbon was contained in the resulting silicon carbide, the silicon carbide was heated in air to burn and remove the carbon, and then treated with hydrofloric acid. In the reaction of Sample No. 7, a large amount of aluminum was used, and in the reaction of Sample No. 9, the reaction was carried out at a high temperature. However, in these reactions, 2H-type silicon carbide was not formed, but 4H-type silicon carbide was formed.

Further, the silicon carbide powders produced without the addition of aluminum in Sample No. 13 and No. 14, have a peak only at a diffraction angle of 33.6° by the CuKα X-ray, and require a high temperature for sintering. Therefore, the silicon carbide powders are essentially different from the silicon carbide powders of the present invention. However, the numerical values calculated from the height of the peak at 33.6° were tentatively listed in Table 4. Contrary to these silicon carbides, silicon carbides produced by the addition of aluminum have all diffraction peaks peculiar to 2H-type silicon carbide.

TABLE 3

| Sample No. | Mixture | Chemical form of aluminum | Amount of aluminum based on 100 parts of SiC to be formed (parts) | Reaction temperature (°C.) |
|---|---|---|---|---|
| 1 | A | ammonium alum | 9.1 | 1,420 |
| 2 | B | metallic aluminum | 9.1 | 1,240 |
| 3 | B | metallic aluminum | 0.5 | 1,380 |
| 4 | B | metallic aluminum | 3.8 | 1,440 |
| 5 | B | metallic aluminum | 9.1 | 1,440 |
| 6 | B | metallic aluminum | 18 | 1,440 |
| 7 | B | metallic aluminum | 28 | 1,440 |
| 8 | B | aluminum isopropoxide | 9.1 | 1,350 |
| 9 | B | aluminum isopropoxide | 9.1 | 1,550 |
| 10 | C | aluminum nitrate | 2.9 | 1,440 |
| 11 | C | aluminum formate | 12 | 1,400 |
| 12 | D | metallic aluminum | 5 | 1,340 |
| 13 | B | | 0 | 1,440 |
| 14 | C | | 0 | 1,440 |

TABLE 4

| Sample No. | 33.6°-2H (%) | 38.2°-2H (%) |
|---|---|---|
| 1 | at least 25.2 | at least 11.4 |
| 2 | at least 40.5 | at least 20.4 |
| 3 | at least 18.0 | at least 3.5 |
| 4 | at least 26.0 | at least 13.0 |
| 5 | at least 49.5 | at least 30.3 |
| 6 | at least 37.0 | at least 19.5 |
| 7 | 4H—type silicon carbide | |
| 8 | at least 35.4 | at least 18.0 |
| 9 | 4H—type silicon carbide | |
| 10 | at least 32.9 | at least 14.1 |
| 11 | at least 35.0 | at least 16.5 |
| 12 | at least 21.0 | at least 10.5 |
| 13 | at least 10.5 | at least 0 |
| 14 | at least 4.8 | at least 0 |

The powders of Sample No. 1 and No. 11 have a specific surface area of 6–10 m$^2$/g, and the powders of Sample Nos. 2–10 have a specific surface area of 30–40 m$^2$/g, which is as large as 3 times of the specific surface area (not larger than 12 m$^2$/g) of the powders of Sample Nos. 13–14 produced without the addition of aluminum.

EXAMPLE 2

A reaction system was previously kept under a reduced pressure of 10$^{-3}$ mmHg, and then the system was filled with pure hydrogen to be reduced to an atmospheric pressure. In separately arranged vessles, aluminum chloride was sublimated at 190° C. and trichloromethylsilane was vaporized at 50° C. Hydrogen was introduced into these vapor-generating vessels, while regulating the flow rates to prepare a mixed vapor consisting of 100 parts of trichloromethylsilane and 2.6 parts of aluminum chloride (this amount of aluminum chloride corresponds to 2 parts, calculated as aluminum, based on 100 parts of silicon carbide to be formed). The hydrogen containing the mixed vapor was blown into a quartz reaction vessel heated at 1,300° C. through its inlet hole at a rate of 2 l/min so as to cause turbulent flow. Deposited film of a part of silicon carbide was formed on the inner surface of the reaction vessel. After the reaction, the gas stream was introduced into a cyclone-shaped flask for collecting powder provided to the outlet hole side of the vessel, and the resulting silicon carbide powders were collected in the flask. Since carbon was contained in the resulting silicon carbide powders, the powders were heated at 450°–500° C. in air to burn and remove the carbon and then treated with hydrofluoric acid to remove silica formed by oxidation.

The resulting silicon carbide powders consisted of 2H-type silicon carbide and β-type silicon carbide. The content of 2H-type silicon carbide in the powders was found to be at least 53% by the analysis from the peak at 33.6° and found to be at least 35.0% even by the analysis from the peak at 38.2°. The powders had a specific surface area of 12 m$^2$/g.

When the above described reaction is carried out at a temperature of 1,200° C., the content of 2H-type silicon carbide in the resulting silicon carbide powders increases by about 5–10%, but the yield of silicon carbide powders is 20–30% lower than the yield in the reation at 1,300° C. Further, when the reaction temperature is lower than 1,200° C., the yield is extremely low. Reversely, when the reaction temperature is 1,400° C., the content of 2H-type silicon carbide is 5–10% lower than the content in the case where the reaction temperature is 1,300° C., but the yield of silicon carbide powders is substantially the same as the case where the reaction temperature is 1,300° C. When the reaction temperature is higher than 1,400° C., the resulting silicon carbide powders have a larger particle size and have a smaller specific surface area. When the reaction temperature exceeds 1,500° C., 2H-type silicon carbide is not substantially formed.

When aluminum is used in an amount of more than 5 parts based on 100 parts of silicon carbide to be formed, 4H-type silicon carbide is formed without forming 2H- type silicon carbide. When the amount of aluminum is less than 0.5 parts, no peak appears at 38.2° in the CuKα X-ray diffraction.

Even when a mixture of vapors of carbon tetrachloride and a hydrocarbon, such as toluene or methane, is used in place of trichloromethylsilane vapor, substantially the same result is obtained.

EXAMPLE 3

Powders for sintering, which had a composition shown in the following Table 5, were molded under a hydrostatic pressure, and the molded article was sintered in pure helium kept under one atmospheric pressure. The composition of the powders for sintering, the sintering temperature and the density of the resulting sintered body (relative density, expressed in percentage, of the sintered body to its theoretical density) are summarized in Table 5. Silicon carbide used in this Example 3 is submicron silicon carbide consisting of 2H-type and β-type silicon carbides. In Table 5, the content of 2H-type silicon carbide in the submicron silicon carbide is described.

TABLE 5

| Sample No. | 2H—type silicon carbide (%) | Aluminum (%) | Boron (%) | Free carbon (%) | Sintering temperature (°C.) | Density (%) |
|---|---|---|---|---|---|---|
| 1 | 0 | 0 | 1.0 | 2.0 | 2,100 | 96 |
| 2 | at least 4 | 0.8 | 1.0 | 1.0 | 2,050 | 91 |
| 3 | at least 11 | 0.3 | 1.0 | 0.8 | 1,970 | 89 |
| 4 | at least 11 | 1.1 | 0.6 | 1.0 | 1,950 | 55 |
| 5 | at least 17 | 2.0 | 1.0 | 1.0 | 1,900 | 94 |
| 6 | at least 20 | 4.8 | 1.0 | 0.4 | 1,740 | 88 |
| 7 | at least 28 | 0.5 | 2.0 | 1.0 | 1,900 | 95 |
| 8 | at least 30 | 1.5 | 0.5 | 0.8 | 1,830 | 93 |
| 9 | at least 35 | 1.2 | 0.4 | 0.8 | 1,850 | 95 |
| 10 | at least 35 | 3.8 | 0.3 | 0.5 | 1,830 | 91 |

In each sample in Table 5, even when a sintering is carried out at a temperature higher than that shown in Table 5, the density of the resulting sintered body does not substantially increase. It can be seen from the result shown in Table 5 that, when the content of 2H-type silicon carbide is at least 10%, a sintered body having a high density can be obtained at a sintering temperature of not higher than 2,000° C., and when aluminum is used in a larger amount, the sintering temperature lowers, but the density of the resulting sintered body is low. The use of boron up to 2% by weight does not so greatly affect the sinterability of silicon carbide powders, but the use of boron in a larger amount decreases the mechanical strength of the resulting sintered body. Of course, the use of a large amount of aluminum and carbon decreases the mechanical strength of the resulting sintered body, and the use of a smaller amount of aluminum and carbon is preferable.

For example, sintered bodies of Sample Nos. 8 and 9 have a bending strength of 65 kg/mm$^2$ in the 3-point bending test under a condition of 10$^{-4}$ mmHg and 1,300° C. While, sintered bodies of sample Nos. 3–7 and 10 have a bending strength within the range of 40–60 kg/mm$^2$ in the 3-point bending test under the same condition as described above.

EXAMPLE 4

A variant amount of β-type submicron silicon carbide was mixed with the finely divided β-type silicon carbide of Sample No. 8 described in Table 5 in Example 3 and having a high content of 2H-type silicon carbide to prepare a silicon carbide mixture, and the resulting silicon carbide mixture was homogeneously mixed together with boron and free carbon to prepare raw material powders for sintering, which contained 1% of each of boron and free carbon. The raw material powders for sintering were molded under a hydrostatic pressure, and the molded article was sintered in pure helium kept under one atmospheric pressure. The mixing ratio of (the β-type submicron silicon carbide)/(the silicon carbide of Sample No. 8 in Table 5) (in the specification, the mixing ratio is represented by weight ratio), the sintering temperature of the raw materials and the density of the resulting sintered body are shown in Table 6. It can be seen from the result of Table 6 that even when the mixing ratio of (the ordinary β-type submicron silicon carbide)/(the silicon carbide of Sample No. 8 in Table 5) is as high as 60/40, a sintered body having a density of 88% can be obtained at a sintering temperature of not higher than 2,000° C., and when the mixing ratio is not higher than 50/50, a sintered body having a density of as high as 97% can be obtained. This fact illustrates that the finely divided silicon carbide having a high content of 2H-type silicon carbide according to the present invention is very easily sinterable, and such excellent effect is due to the presence of at least 10% of 2H-type silicon carbide in the silicon carbide mixture.

The resulting sintered bodies had crystal structures consisting of β-type crystal structure and 4H-type crystal structure mainly formed by the transformation of 2H-type silicon carbide as well as the sintered bodies of Sample Nos. 3–10 described in Table 5 of Example 3.

TABLE 6

| Mixing ratio of (submicron β-SiC) /(SiC of No. 8 in Table 5) | Sintering temperature (°C.) | Density (%) |
|---|---|---|
| 0/100 | 1,850 | 93 |
| 25/75 | 1,960 | 97 |
| 50/50 | 1,980 | 97 |
| 60/40 | 2,000 | 88 |
| 60/40 | 2,070 | 96 |
| 100/0 | 2,100 | 96 |

EXAMPLE 5

The powders for sintering of Sample No. 1 described in Table 5 in Example 3, which consisted mainly of finely divided β-type silicon carbide and containing 1% of each of boron and carbon, was homogeneously mixed with metallic aluminum having a purity of 99.5% and an average particle size of 5 μm by the acetone wet process by means of a plastic ball mill to prepare raw material powders for sintering. The powders were molded under a hydrostatic pressure to produce a molded article having a density of 50% of the theoretical density. The molded article was sintered in pure helium kept under one atmospheric pressure to obtain a sintered body. When aluminum content in the raw material powders for sintering was 1%, the sintering temperature was 2,020° C., and the density of the sintered body was only 84%. When aluminum content in the raw material powders was 2%, the sintering temperature was 2,000° C. and the density of the sintered body was only 84%. Therefore, it can be understood that silicon carbide powders must be produced in the presence of aluminum so as to form 2H-type silicon carbide.

However, when aluminum is not contained in the raw material powders for sintering, the sintering temperature is 2,000° C. and the density of the sintered body is as low as 80%. Therefore, it can be seen that even when aluminum is added to silicon carbide powders produced without the use of aluminum, aluminum is somewhat effective as a sintering aid.

EXAMPLE 6

Silicon carbide powders containing 2H-type silicon carbide were homogeneously mixed with boron and free carbon to prepare raw material powders for hot pressing, which had a composition shown in the following Table 7. The raw material powders for hot pressing where filled in a graphite crucible (20 mm×20 mm), and hot pressed under a pressure of 300 kg/cm² in pure argon. The content of 2H-type silicon carbide in the silicon carbide, the amounts of aluminum, boron and free carbon contained in the raw material powders for hot pressing, the hot press temperature, and the density of the sintered body are summarized in Table 7.

In each sample in Table 7, even when a hot pressing is carried out at a temperature higher than that shown in Table 7, the density of the resulting sintered body does not substantially increase. It can be seen from the result shown in Table 7 that, when the content of 2H-type silicon carbide is at least 10%, a sintered body having a high density can be obtained by a hot pressing at a temperature of not hither than 1,900° C., and when aluminum is used in a larger amount, the hot press temperature lowers, but the resulting sintered body is poor in the mechanical strength. When the amount of boron and carbon are increased, the resulting sintered body is poor in the mechanical strength similarly to the case of aluminum. Further, hot press temperature is higher, the particle size of the resulting sintered body increases up to about 3 μm, and therefore the sintered body is poor in the mechanical strength.

For example, sintered bodies of Sample Nos. 8 and 9 have a bending strength of about 70 kg/mm² in the 3-point bending test under a condition of $10^{-4}$ mmHg and 1,400° C. While, sintered bodies of Sample Nos. 3–7 and 10 have a beinding strength within the range of 50–60 kg/mm² in the same bending test as described above.

These sintered bodies according to the present invention are characterized in that the sintered bodies have a uniform texture consisting of very fine particles having a size of not larger than 3 μm and have crystal structures consisting of β-type crystal structure and 4H-type crystal structure mainly formed by the transformation of 2H-type crystal structure.

TABLE 7

| Sample No. | Composition of powders for hot pressing | | | | Hot press temperature (°C.) | Density |
|---|---|---|---|---|---|---|
| | 2H—type silicon carbide (%) | Aluminum (%) | Boron (%) | Free carbon (%) | | |
| 1 | 0 | 0 | 1.0 | 1.0 | 1,980 | 97 |
| 2 | at least 4 | 0.8 | 1.0 | 1.0 | 1,930 | 96 |
| 3 | at least 11 | 0.3 | 1.0 | 0.8 | 1,880 | 96 |
| 4 | at least 11 | 1.1 | 0.6 | 1.0 | 1,850 | 94 |
| 5 | at least 17 | 2.0 | 1.0 | 1.0 | 1,750 | 95 |
| 6 | at least 20 | 4.8 | 1.0 | 0.4 | 1,580 | 93 |
| 7 | at least 28 | 0.5 | 2.0 | 1.0 | 1,770 | 96 |
| 8 | at least 30 | 1.5 | 0.5 | 0.8 | 1,650 | 97 |
| 9 | at least 35 | 1.2 | 0.4 | 0.8 | 1,670 | 97 |

TABLE 7-continued

| Sample No. | Composition of powders for hot pressing | | | | Hot press temperature (°C.) | Density |
|---|---|---|---|---|---|---|
| | 2H—type silicon carbide (%) | Aluminum (%) | Boron (%) | Free carbon (%) | | |
| 10 | at least 35 | 3.8 | 0.3 | 0.5 | 1,650 | 95 |

EXAMPLE 7

The powders for hot pressing of Sample No. 6 and No. 8 described in Table 7 in Example 6 were hot pressed under an increased pressure of 700 kg/cm². As the result, sintered bodies having the same densities as those of sintered bodies of Sample No. 6 and No. 8 in Table 7 were obtained from the powders of Sample No. 6 at a hot press temperature of as low as 1,540° C., and from the powders of Sample No. 8 at a hot press temperature of as low as 1,620° C., respectively. Reversely, when a hot pressing is carried out at a temperature 80°–100° C. higher than the hot press temperature described in Table 5, the hot press pressure can be decreased to a low pressure of 50–100 kg/cm².

EXAMPLE 8

The silicon carbide powders of Sample No. 8 described in Table 7 in Example 6 were homogeneously mixed with a variant amount of the β-type silicon carbide powders of Sample No. 1 described in Table 7 to prepare a silicon carbide powdery mixture. The mixture was mixed with boron and free carbon in amounts that the resulting mixture contained 1% of each of boron and free carbon, and the resulting mixture was used as raw material powders for hot pressing. The raw material powders were hot pressed under a pressure of 300 kg/cm² in pure argon. The following Table 8 shows the mixing ratio of (the β-type silicon carbide of Sample No. 1 in Table 7)/(the silicon carbide of Sample No. 8 in Table 7), the hot press temperature and the density of the resulting sintered body. It can be seen from Table 8 that, when the mixing ratio of (ordinary β-type submicron silicon carbide/finely divided silicon carbide having a high content of 2H-type silicon carbide according to the present invention) is not higher than 50/50, the resulting silicon carbide mixture can be hot pressed into a sintered body at a temperature of not higher than 1,900° C., and further a sintered body having a density of as high as 98% can be obtained. This fact illustrates that 2H type silicon carbide is very easily sinterable. Further, excellent effect occurs due to the reason that at least 10% of 2H-type silicon carbide is contained in the silicon carbide mixture.

TABLE 8

| Mixing ratio of (β-SiC of No. 1 in Table 7)/ (SiC of No. 8 in Table 7) | Hot press temperature (°C.) | Density (%) |
|---|---|---|
| 0/100 | 1,650 | 97 |
| 25/75 | 1,840 | 98 |
| 50/50 | 1,850 | 98 |
| 60/40 | 1,950 | 98 |
| 100/0 | 1,980 | 97 |

EXAMPLE 9

The silicon carbide powders of Sample No. 8 described in Table 7 in Example 6 were homogeneously mixed with a variant amount of ordinary α-type submicron silicon carbide, which is a mixture of silicon carbides of 4H-type, 6H-type and 15R-type regardless of their content, to prepare a silicon carbide mixture. The mixture was mixed with boron and free carbon in amounts that the resulting mixture contained 1% of each of boron and free carbon, and the resulting mixture was used as raw material powders for hot pressing. The raw material powders were hot pressed under a pressure of 300 kg/cm$^2$ in pure argon. The following Table 9 shows the mixing ratio of (the α-type submicron silicon carbide)/(the silicon carbide powders of Sample No. 8 in Table 7), the hot press temperature and the density of the resulting sintered body. In this Example 9 also, the high hot press temperature required in the sintering of α-type silicon carbide alone was able to be decreased to not higher than 1,900° C. similarly to the case of Example 7.

In this Example 9 also, since at least 10% of 2H-type silicon carbide is contained in the raw material powders for hot pressing, 2H-type silicon carbide develops effectively its easily sinterable property.

TABLE 9

| Mixing ratio of (submicron α-SiC)/(SiC of No. 8 in Table 7) | Hot press temperature (°C.) | Density (%) |
| --- | --- | --- |
| 0/100 | 1,650 | 97 |
| 25/75 | 1,800 | 98 |
| 50/50 | 1,820 | 98 |
| 70/30 | 1,900 | 97 |
| 100/0 | 1,950 | 97 |

What is claimed is:

1. A method of producing finely divided submicron silicon carbide powder comprising at least 10% by weight of 2H-type silicon carbide, comprising reacting a mixture of carbon powders consisting of finely divided particles or an organic compound which is converted into finely divided carbon by heating, with a silicon source selected from the group of sources consisting of silicon, silicon monoxide, silicon dioxide and silicon compounds which are converted into silicon, silicon monoxide or silicon dioxide by heating, said reacting occurring at a temperature of 1,200°–1,500° C. under a reduced pressure having a vacuum degree of not lower than 10 mm Hg in the presence of metallic aluminum or an organic or inorganic aluminum compound which is converted into aluminum by heating, said metallic aluminum or aluminum compound being dispersed homogeneously in said mixture, the amount of said metallic aluminum or aluminum compound, calculated as aluminum, being 1–20 parts by weight based on 100 parts by weight of silicon carbide to be formed.

2. A method or producing finely divided submicron silicon carbide powder comprising at least 10% by weight of 2H-type silicon carbide, comprising either reacting a mixture consisting essentially of vapors of a silicon halide and a hydrocarbon or decomposing trichloromethylsilane vapors, said reacting and said decomposing occurring at a temperature of 1,200°–1,500° C. in the presence of a vapor of aluminum halide dispersed homogeneously in said vapors, the amount of said aluminum halide being 0.5–5 parts by weight, calculated as aluminum, based on 100 parts by weight of silicon carbide to be formed.

3. A method of producing a high density silicon carbide sintered body, comprising molding a homogeneous powdery mixture consisting essentially of submicron silicon carbide powder and 0.1–2.0% by weight of boron and 0.1–1.0% by weight of free carbon into a shaped article, said submicron silicon carbide powder comprising at least 10% by weight of 2H-type silicon carbide; aluminum present in an effective amount for sintering from 0.3–4.9% by weight, said aluminum being homogeneously dispersed in said silicon carbide powder, said submicron silicon carbide powder having a specific surface area of at least 5 m$^2$/g, and the remainder of said powder being β-type silicon carbide, the submicron silicon carbide powder being made by a method comprising reacting a mixture of carbon powders consisting of finely divided particles or an organic compound which is converted into finely divided carbon by heating, with a silicon source selected from the group of sources consisting of silicon, silicon monoxide, silicon dioxide and silicon compounds which are converted into silicon, silicon monoxide or silicon dioxide by heating, said reacting occuring at a temperature of 1,200°–1,500° C. under a reduced pressure having a vacuum degree of not lower than 10 mm Hg, in the presence of metallic aluminum or an organic or an inorganic aluminum compound which is converted into aluminum by heating, said metallic aluminum or aluminum compound being dispersed homogeneously in said mixture, the amount of said metallic aluminum or aluminum compound calculated as aluminum, being 1–20 parts by weight based on 100 parts by weight of silicon carbide to be formed; and sintering the shaped article at a temperature of 1,700°–2,000° C. under an essentially inert atmosphere.

4. A method of producing a high density silicon carbide hot pressed body, comprising hot pressing a homogeneous powdery mixture consisting essentially of submicron silicon carbide powder and 0.1–2.0% by weight of boron and 0.1–1.0% by weight of free carbon, under a pressure of 50–700 Kg/cm$^2$ at a temperature of 1,500°–1,900° C., in an inert atmosphere for a sufficient amount of time to form a solid hot pressed article, said submicron silicon carbide powder comprising at least 10% by weight of 2H-type silicon carbide; aluminum present in an effective amount for sintering from 0.3–4.9% by weight, said aluminum being homogeneously dispersed in said submicron silicon carbide powder, said submicron silicon carbide powder having a specific surface area of at least 5 m$^2$g/, and the remainder of said powder being β-type silicon carbide, the submicron silicon carbide powder being made by a method comprising reacting a mixture of carbon powders consisting of finely divided particles or an organic compound which is converted into finely divided carbon by heating, with a silicon source selected from the group of sources consisting of silicon, silicon monoxide, silicon dioxide and silicon compounds which are converted into silicon, silicon monoxide or silicon dioxide by heating, said reacting occurring at a temperature of 1,200°–1,500° C. under a reduced pressure having a vacuum degree of not lower than 10 mm Hg, in the presence of metallic aluminum or an organic or an inorganic aluminum compound which is converted into aluminum by heating, said metallic aluminum or aluminum compound being dispersed homogeneously in said mixture, the amount of said metallic aluminum or aluminum compound calculated as aluminum, being 1-20 parts by weight based on 100 parts by weight of silicon carbide to be formed.

5. Finely divided submicron silicon carbide powder consisting essentially of at least 10% by weight of 2H-type silicon carbide; aluminum, present in an effective amount for sintering from 0.3 to 4.9% by weight, said aluminum being homogeneously dispersed in said submicron silicon carbide powder, said submicron silicon carbide powder having a specific surface area of at least 5 m$^2$/g, and the remainder of said powder being β-type silicon carbide, the submicron silicon carbide powder being made by a method comprising reacting a mixture of carbon powders consisting of finely divided particles or an organic compound which is converted into finely divided carbon by heating, with a silicon source selected from the group of sources consisting of silicon, silicon monoxide, silicon dioxide and silicon compounds which are converted into silicon, silicon monoxide or silicon dioxide by heating, said reacting occurring at a temperature of 1,200°-1,500° C. under a reduced pressure having a vacuum degree of not lower than 10 mm Hg in the presence of metallic aluminum or an organic or an inorganic aluminum compound which is converted into aluminum by heating, said metallic aluminum or aluminum compound being dispersed homogeneously in said mixture, the amount of said metallic aluminum or aluminum compound calculated as aluminum, being 1-20 parts by weight based on 100 parts by weight of silicon carbide to be formed.

6. Finely divided submicron silicon carbide powder consisting essentially of at least 10% by weight of 2H-type silicon carbide; aluminum, present in an effective amount for sintering from 0.3-4.9% by weight, said aluminum being homogeneously dispersed in said submicron silicon carbide powder and the remainder being β-type silicon carbide, said submicron silicon carbide powder having a specific surface area of at least 5 m$^2$/g made by a method comprising either reacting a mixture consisting essentially of vapors of a silicon halide and a hydrocarbon or decomposing trichloromethysilane vapors, said reacting and said decomposing occurring at a temperature of 1,200°-1,500° C. in the presence of a vapor of aluminum halide dispersed homogeneously in said vapors, the amount of said aluminum halide being 0.5-5 parts by weight, calculated as aluminum, based on 100 parts by weight of silicon carbide to be formed.

7. A high-density silicon carbide sintered body having crystal structures consisting of β-type and 4H-type crystal structures and having a density of at least 85% of theoretical density, made by a method comprising: molding a homogeneous powdery mixture consisting essentially of submicron silicon carbide and 0.1-2.0% by weight of boron and 0.1-1.0% by weight of free carbon into a shaped article, said submicron silicon carbide powder comprising at least 10% by weight of 2H-type silicon carbide; aluminum present in an effective amount for sintering from 0.3 to 4.9% by weight, said aluminum being homogeneously dispersed in said submicron silicon carbide powder, said submicron silicon carbide powder having a specific surface area of at least 5 m$^2$/g, and the remainder of said submicron silicon carbide powder being β-type silicon carbide, the submicron silicon carbide powder being made by a method comprising reacting a mixture of carbon powders consisting of finely divided particles or an organic compound which is converted into finely divided carbon by heating, with a silicon source selected from the group of sources consisting of silicon, silicon monoxide, silicon dioxide and silicon compounds which are converted into silicon, silicon monoxide or silicon dioxide by heating, said reacting occurring at a temperature of 1,200°-1,500° C. under a reduced pressure having a vacuum degree of not lower than 10 mm Hg, in the presence of metallic aluminum or an organic or an inorganic aluminum compound which is converted into aluminum by heating, said metallic aluminum or aluminum compound being dispersed homogeneously in said mixture the amount of said metallic aluminum or aluminum compound calculated as aluminum being 1-20 parts by weight based on 100 parts by weight of silicon carbide to be formed; and sintering the shaped article at a temperature of 1,700°-2,000° C. under an essentially inert atmosphere.

8. A high-density silicon carbide hot pressed body having crystal structures consisting of β-type and 4H-type crystal structures and having a density of at least 85% of theoretical density, made by a method comprising hot pressing a homogeneous powdery mixture consisting essentially of submicron silicon carbide and 0.1-2.0% by weight of boron and 0.1-1.0% by weight of free carbon, under a pressure of 50-700 kg/cm$^2$ at a temperature of 1,500°-1,900° C., in an inert atmosphere for a sufficient amount of time to form a solid hot pressed article, said submicron silicon carbide powder comprising at least 10% by weight of 2H-type silicon carbide; aluminum present in an effective amount for sintering from 0.3 to 4.9% by weight, said aluminum being homogeneously dispersed in said submicron silicon carbide powder, said submicron silicon carbide powder having a specific surface area of at least 5 m$^2$/g, and the remainder of said submicron silicon carbide powder being β-type silicon carbide, the submicron silicon carbide powder being made by a method comprising reacting a mixture of carbon powders consisting of finely divided particles or an organic compound which is converted into finely divided carbon by heating, with a silicon source selected from the group of sources consisting of silicon, silicon monoxide, silicon dioxide and silicon compounds which are converted into silicon, silicon monoxide or silicon dioxide by heating, said reacting occurring at a temperature of 1,200°-1,500° C., under a reduced pressure having a vacuum degree of not lower than 10 mm Hg, in the presence of metallic aluminum or an organic or an inorganic aluminum compound which is converted to aluminum by heating, said metallic aluminum or aluminum compound being dispersed homogeneously in said mixture, the amount of said metallic aluminum or aluminum compound calculated as aluminum, being 1-20 parts by weight based on 100 parts by weight of silicon carbide to be formed.

9. A method of producing a high-density silicon carbide sintered body, comprising molding a homogeneous powdery mixture consisting essentially of submicron silicon carbide powder and 0.1-2.0% by weight of boron and 0.1-1.0% by weight of free carbon into a shaped article, said submicron silicon carbide powder consisting essentially of at least 10% by weight of 2H-type silicon carbide; aluminum present in an effective amount for sintering from 0.3-4.9% by weight, said aluminum being homogeneously dispersed in said silicon carbide powder, said submicron silicon carbide powder having a specific surface area of at least 5 m$^2$/g, and the remainder of said submicron silicon carbide powder being β-type silicon carbide, the submicron silicon carbide powder being made by a method comprising either reacting a mixture consisting essentially of vapors of a silicon halide and a hydrocarbon, or decomposing trichloromethylsilane vapors said reacting and said decomposing occurring at a temperature of 1,200°–1,500° C., in the presence of a vapor of aluminum halide dispersed homogeneously in said vapors, the amount of said aluminum halide being 0.5–5 parts by weight, calculated as aluminum, based on 100 parts by weight of silicon carbide to be formed; and sintering the shaped article at a temperature of 1,700°–2,000° C. under an essentially inert atmosphere.

10. A method of producing a high-density silicon carbide not pressed body comprising hot pressing a homogeneous powdery mixture consisting essentially of submicron silicon carbide powder and 0.1–2.0% by weight of boron and 0.1–1.0% by weight of free carbon under a pressure of 50–700 kg/cm$^2$ at a temperature of 1,500°–1,900° C., in an inert atmosphere for a sufficient amount of time to form a solid hot-pressed article, said submicron silicon carbide powder consisting essentially of at least 10% by weight of 2H-type silicon carbide; aluminum present in an effective amount for sintering from 0.3–4.9% by weight, said aluminum being homogeneously dispersed in said submicron silicon carbide powder and the remainder of said submicron silicon carbide powder being β-type silicon carbide, said submicron silicon carbide powder having a specific surface area of at least 5 m$^2$/g, the submicron silicon carbide powder being made by a method comprising either reacting a mixture consisting essentially of vapors of a silicon halide and a hydrocarbon, or decomposing trichloromethylsilane vapors, said reacting and said decomposing occurring at a temperature of 1,200°–1,500° C. in the presence of a vapor of aluminum halide dispersed homogeneously in said vapors, the amount of said aluminum halide being 0.5–5 parts by weight, calculated as aluminum based on 100 parts by weight of silicon carbide to be formed.

11. A high-density silicon carbide sintered body having crystal structures consisting of β-type and 4H-type crystal structures and having a density of at least 85% of theoretical density made by a method comprising molding a homogeneous powdery mixture consisting essentially of submicron silicon carbide powder and 0.1–2.0% by weight of boron and 0.1–1.0% by weight of free carbon into a shaped article, said submicron silicon carbide powder consisting essentially of at least 10% by weight of 2H-type silicon carbide; aluminum present in an effective amount for sintering from 0.3 to 4.9% by weight, said aluminum being homogeneously dispersed in said silicon carbide powder, said silicon carbide powder having a specific surface area of at least 5 m$^2$/g, and the remainder of said submicron silicon carbide powder being β-type silicon carbide, the submicron silicon carbide powder being made by a method comprising either reacting a mixture consisting essentially of vapors of a silicon halide and a hydrocarbon, or decomposing trichloromethylsilane vapors, said reacting and said decomposing occurring at a temperature of 1,200°–1,500° C. in the presence of a vapor of aluminum halide dispersed homogeneously in said vapors, the amount of said aluminum halide being 0.5–5 parts by weight, calculated as aluminum, based on 100 parts by weight of silicon carbide to be formed; and sintering the shaped article at a temperature of 1,700°–2,000° C. under an essentially inert atmosphere.

12. A high-density silicon carbide hot pressed body having crystal structures consisting of β-type and 4H-type crystal structures and having a density of at least 85% of theoretical density, made by a method comprising hot pressing a homogeneous powdery mixture consisting essentially of submicron silicon carbide and 0.1–2.0% by weight of boron and 0.1–1.0% by weight of free carbon, under a pressure of 50–700 kg/cm$^2$ at a temperature of 1,500°–1,900° C. in an inert atmosphere for a sufficient amount of time to form a solid hot-pressed article, said submicron silicon carbide powder consisting essentially of at least 10% by weight of 2H-type silicon carbide; aluminum present in an effective amount for sintering from 0.3 to 4.9% by weight, said aluminum being homogeneously dispersed in said silicon carbide powder and the remainder of said submicron silicon carbide powder being β-type silicon carbide, said submicron silicon carbide powder having a specific surface area of at least 5 m$^2$/g, the submicron silicon carbide powder being made by a method comprising either reacting a mixture consisting essentially of vapors of a silicon halide and a hydrocarbon, or decomposing trichloromethylsilane vapors, said reacting and said decomposing occurring at a temperature of 1,200°–1,500° C. in the presence of a vapor of aluminum halide dispersed homogeneously in said vapors, the amount of said aluminum halide being 0.5–5 parts by weight, calculated as aluminum based on 100 parts by weight of silicon carbide to be formed.

* * * * *